US011406202B2

(12) United States Patent
Shigrin Sokol

(10) Patent No.: US 11,406,202 B2
(45) Date of Patent: Aug. 9, 2022

(54) MULTILAYER SAFETY BLANKET AND SYSTEM

(71) Applicant: Michael Shigrin Sokol, Haifa (IL)

(72) Inventor: Michael Shigrin Sokol, Haifa (IL)

(\*) Notice: Subject to any disclaimer, the term of this patent is extended or adjusted under 35 U.S.C. 154(b) by 22 days.

(21) Appl. No.: 16/960,092

(22) PCT Filed: Jan. 2, 2019

(86) PCT No.: PCT/IB2019/050018
§ 371 (c)(1),
(2) Date: Jul. 6, 2020

(87) PCT Pub. No.: WO2019/135171
PCT Pub. Date: Jul. 11, 2019

(65) Prior Publication Data
US 2021/0059432 A1  Mar. 4, 2021

(30) Foreign Application Priority Data
Jan. 3, 2018  (GB) ...................................... 1800056

(51) Int. Cl.
| A47D 15/02 | (2006.01) |
| A47G 9/02 | (2006.01) |
| A47G 9/04 | (2006.01) |
| A01K 1/035 | (2006.01) |
| B62B 9/24 | (2006.01) |

(52) U.S. Cl.
CPC .............. *A47D 15/02* (2013.01); *A01K 1/035* (2013.01); *A47G 9/0223* (2013.01); *A47G 9/04* (2013.01); *B62B 9/24* (2013.01)

(58) Field of Classification Search
CPC ........ A47G 9/023; A47G 9/0223; A47G 9/04; A47D 15/02
See application file for complete search history.

(56) References Cited

U.S. PATENT DOCUMENTS

| 2,779,985 | A | \* | 2/1957 | Turner | .................. A47D 15/02 24/72.5 |
| 2018/0035832 | A1 | \* | 2/2018 | Ureten | .................. A61M 21/02 |
| 2019/0082865 | A1 | \* | 3/2019 | Carlson | ................ A47G 9/0223 |

FOREIGN PATENT DOCUMENTS

CA          2683107 A1 *   4/2011    ............. A47G 9/068

\* cited by examiner

*Primary Examiner* — Peter M. Cuomo
*Assistant Examiner* — Adam C Ortiz
(74) *Attorney, Agent, or Firm* — Momentum IP; Marc Van Dyke

(57) ABSTRACT

A blanket system for covering a user positioned on a user base platform having a mounting element, the blanket including a first layer a first length ($l_1$) and a first width ($w_1$); a second layer having a second length ($l_2$) and a second width ($w_2$), the second length being greater than the first length and the second width being greater than the first width; and the blanket adapted to have an operative hanging mode, wherein the first and second layers are attached to one another around a perimeter of the blanket and along at least one internal elongate stretch of the blanket, so as to define at least two pockets formed the first and second layers, wherein, in the operative hanging mode, the at least two pockets each have a depth (D) between the first layer and the second layer, the depth being in the range of 10 cm-30 cm.

20 Claims, 9 Drawing Sheets

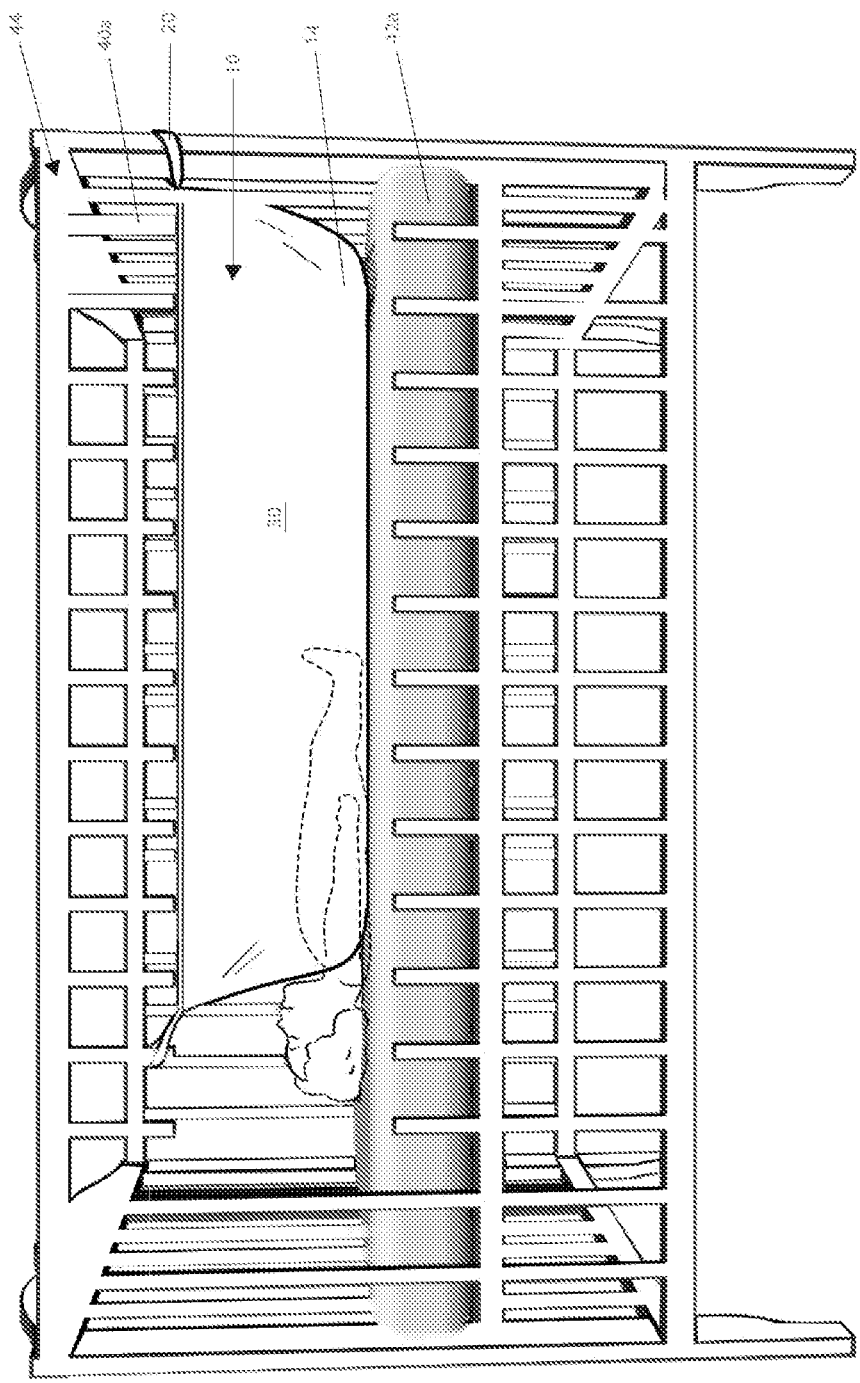

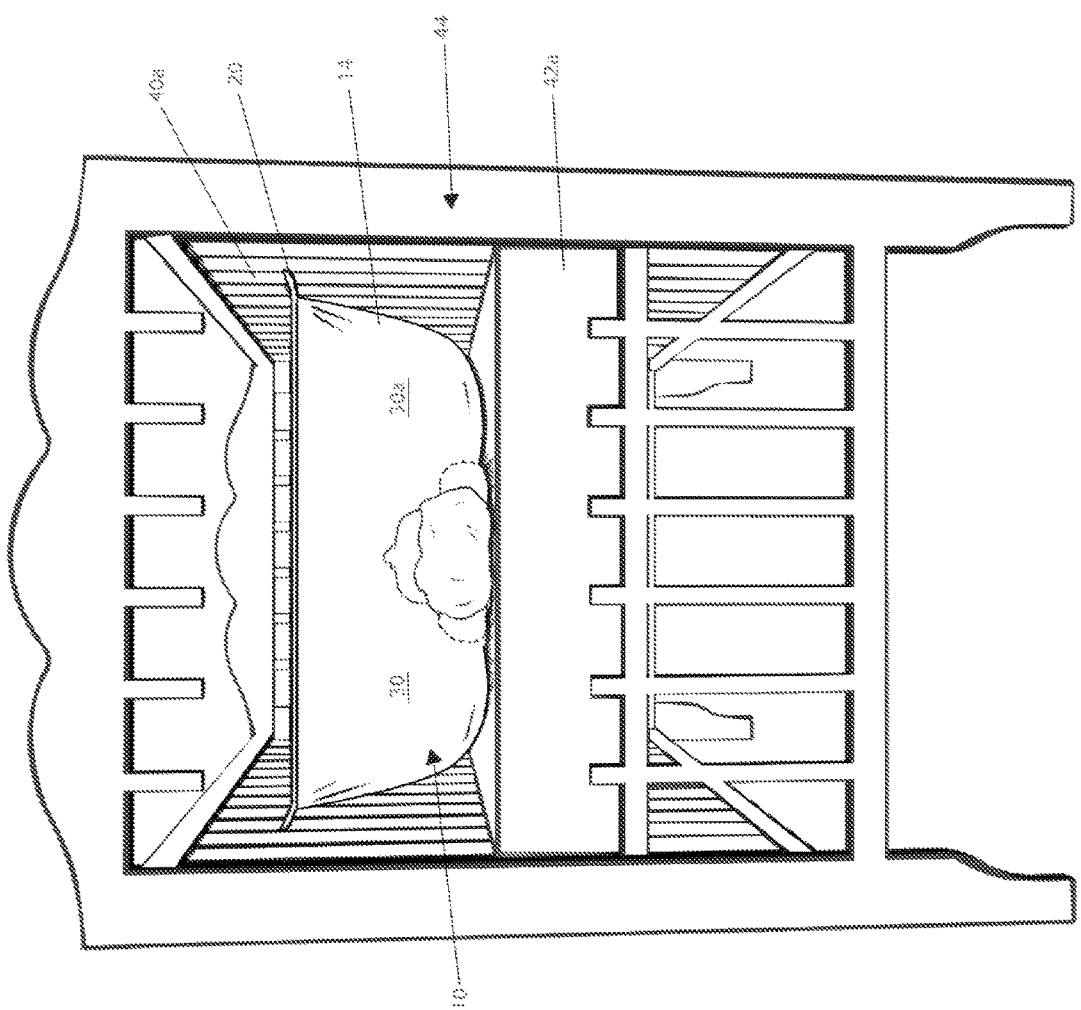

//"# MULTILAYER SAFETY BLANKET AND SYSTEM

This invention claims priority from Great Britain Application Number 1800056.2, filed Jan. 3, 2018, which application is incorporated by reference for all purposes as if fully set forth herein.

FIELD OF THE INVENTION

The present invention relates to blankets having multiple layers and to systems and methods for use thereof.

BACKGROUND OF THE INVENTION

The present invention relates to blankets having multiple layers and to systems and methods for use thereof. Specifically, the present invention relates to blankets that do not become tangled around the user, and therefore provide added safety.

The prior art relates to blankets having two components and/or sections with different levels of warmth or heat retention. For example, a blanket and a sheet are used together such that the blanket could be partially removed leaving the sheet in place.

In some baby blankets, seams connect layers of the blanket, for example to close a bottom end thereof to form a sleep-sack, so that a baby could be secured within the blanket by inserting the baby into the open end.

In other blankets, fasteners and straps are used to restrain the torso or arms of a person in a desired position. For example, baby blankets or sleep sacks may be used to retain the baby's hands along the body, thereby preventing the baby from pulling off the blanket, or from jerking around and waking himself up.

The inventor has perceived the need for improved blankets and blanket systems, and in particular, for a blanket that provides warmth and does not restrict the user's movement, while ensuring that the blanket remains in place even when the user moves around while covered by the blanket, and which prevents suffocation is beneath the blanket for an extended time.

SUMMARY OF THE INVENTION

The present invention relates to blankets having multiple layers and to systems and methods for use thereof.

In accordance with an aspect of an embodiment of the teachings herein, there is provided a system for covering a user, the system including:
a user base platform adapted to have the user positioned thereon;
at least one mounting element, disposed about the user base platform;
a blanket, including:
  a first layer formed of a first stretch of fabric, the first stretch of fabric having a first length ($l_1$) and a first width ($w_1$);
  a second layer formed of a second stretch of fabric, the second stretch of fabric having a second length ($l_2$) and a second width ($w_2$), the second length being greater than the first length and the second width being greater than the first width; and
an attachment mechanism adapted to attach the blanket to the at least one mounting element,
the system adapted to have an operative, hanging mode, in which the blanket is attached to the at least one mounting element and hangs over the user base platform;
wherein the first and second layers are attached to one another so as to be juxtaposed around a perimeter of the blanket, and along at least one internal elongate stretch of the blanket so as to define at least two pockets formed between the first and second layers,
wherein, in the operative, hanging mode, the at least two pockets each have a respective depth (D), greater than zero, between the first layer and the second layer, and
wherein, in the operative, hanging mode, at least one air gap is formed between the at least two pockets.

In some embodiments, in the operative hanging mode, the second layer of each of the pockets defines an apex at the depth D, and wherein when the user is positioned on the user base and the system is in the operative hanging mode, the apexes of the at least two pockets come into contact with the user.

In some embodiments, the first layer includes an insulating layer. In some embodiments, the second layer is formed of a fabric having insulating properties.

In some embodiments, the second width is greater than the first width by at least 20%, at least 30%, at least 40%, or at least 50%. In some embodiments, a width ratio between the first width and the second width is in the range of 1:1.1-1:2. In some embodiments, the second width is greater than the first width by at least 10 cm, at least 20 cm, at least 30 cm, or at least 40 cm.

In some embodiments, the second length is greater than the first length by at least 20%, at least 30%, at least 40%, or at least 50%. In some embodiments, a width ratio between the first length and the second length is in the range of 1:1.1-1:2. In some embodiments, the second length is greater than the first length by at least 10 cm, at least 20 cm, at least 30 cm, or at least 40 cm.

In some embodiments, the depth D is in the range of 10 cm-30 cm, 12 cm-25 cm, or 15 cm-20 cm.

In some embodiments, in the hanging mode, the second layer of each of the pockets defines an apex at the depth D, and wherein a width of the air gap ($w_g$), defined between apexes of at least two of the pockets surrounding the air gap, is in the range of 20 cm-40 cm, 25 cm-35 cm, or 28 cm-32 cm.

In some embodiments, in the hanging mode, a minimal width ($W_m$) of the air gap, defined between at least two of the pockets surrounding the air gap adjacent the first layer, is in the range of 0 cm-10 cm.

In some embodiments, the volume ($v_g$) of the air gap is sufficient to allow the user to breathe beneath the blanket without risk of suffocation.

In some embodiments, at least one of the first layer and the second layer includes a flame retardant layer. In some embodiments, at least one of the first layer and the second layer includes a hypoallergenic layer.

In some embodiments, the system further includes at least one additional layer disposed between the first layer and the second layer. In some embodiments, the at least one additional layer includes a flame retardant layer. In some embodiments, the at least one additional layer includes a hypoallergenic layer.

In some embodiments, at least one of the pockets is filled with a filling material other than air. In some embodiments, the filling material includes at least one of feathers, down, cotton, cashmere, wool, Merino wool, alpaca, fleece, fur, faux fur, polyester, and acrylic.

In some embodiments, the user base platform includes a mattress of a bed, and the at least one mounting element includes at least one pole disposed at an edge of the bed. In some embodiments, the bed includes a hospital bed, and the at least one pole includes part of a frame of the hospital bed. In some embodiments, the pole includes at least part of a barrier for preventing the user from falling off the bed.

In some embodiments, the user base platform includes a mattress of a crib, and the at least one mounting element includes a portion of a frame of the crib.

In some embodiments, the user base platform includes a seat of a stroller, and the at least one mounting element includes at least part of a frame of the stroller.

In some embodiments, the user is an animal. In some embodiments, the user base platform includes an animal sleeping basket, and the at least one mounting element includes a protrusion at an edge of the animal sleeping basket.

In some embodiments, the attachment mechanism includes at least one loop disposed about the at least one mounting element. In some embodiments, the at least one loop includes a closed loop adapted to be slid onto the at least one mounting element. In some embodiments, the at least one loop includes at least two straps adapted to be tied about the at least one mounting element to form the loop.

In some embodiments, the attachment mechanism includes a first portion of a snap fit engagement, and the at least one mounting element includes a second portion of the snap fit engagement, such that the blanket is attached to the mounting element by snap fit engagement of the first and second portions.

In some embodiments, the attachment mechanism includes at least one clasping unit attached to the at least one mounting element and adapted to clasp at least one portion of the blanket.

In some embodiments, the attachment mechanism includes at least one Velcro portion. In some embodiments, the at least one Velcro portion is attached to the blanket, and the system further includes at least one corresponding Velcro portion attached to the at least one mounting element, such that the blanket is adapted to be attached to the at least one mounting element by attachment of the at least one Velcro portion and the at least one corresponding Velcro portion. In some embodiments, the attachment mechanism includes an elongate strip including a hook Velcro portion and a corresponding loop Velcro portion, the hook and loop Velcro portions being adapted to engage each other such that the strip forms a loop about the at least one mounting element.

In some embodiments, the attachment mechanism includes at least one magnetic element. In some embodiments, the at least one magnetic element is attached to the blanket, and the system further includes at least one corresponding magnetic element attached to the at least one mounting element, such that the blanket is adapted to be attached to the at least one mounting element by magnetic attachment of the at least one magnetic element and the at least one corresponding magnetic element. In some embodiments, the attachment mechanism includes an elongate strip including a first and second magnetic elements, the first and second magnetic elements being adapted to magnetically engage each other such that the strip forms a loop about the at least one mounting element.

In some embodiments, the attachment mechanism attaches the blanket to the at least one mounting element at at least two edges or two corners of the blanket, such that a tension of the blanket in at least one dimension thereof does not change even if the user moves beneath the blanket. In some embodiments, the attachment mechanism attaches the blanket to the at least one mounting element at four points about the perimeter of the blanket, such that a tension of the blanket does not change even if the user moves beneath the blanket.

In accordance with an aspect of another embodiment of the teachings herein, there is provided a blanket for covering a user positioned on a user base platform, the user base platform including at least one mounting element, the blanket including: a first layer formed of a first stretch of fabric, the first stretch of fabric having a first length ($l_1$) and a first width ($w_1$);

a second layer formed of a second stretch of fabric, the second stretch of fabric having a second length ($l_2$) and a second width ($w_2$), the second length being greater than the first length and the second width being greater than the first width; and the blanket adapted to have a flat mode when laid out on a base surface, and an operative hanging mode when held up at points along a perimeter thereof, wherein the first and second layers are attached to one another so as to be juxtaposed around a perimeter of the blanket, and along at least one internal elongate stretch of the blanket, so as to define at least two pockets formed the first and second layers, wherein, in the operative hanging mode, the at least two pockets each have a respective depth (D) between the first layer and the second layer, the depth being in the range of 10 cm-30 cm, and wherein, in the operative hanging mode, at least one air gap is formed between the at least two pockets, the at least one air gap having a gap width ($w_g$) defined between apexes of at least two the pockets surrounding the air gap at which the pockets have the depth (D), the gap width being in the range of 20 cm-40 cm.

In some embodiments, the blanket further includes an attachment mechanism adapted for attachment of the blanket to the at least one mounting element of the user base platform.

In some embodiments, the attachment mechanism includes at least one loop adapted to be disposed about the at least one mounting element. In some embodiments, the at least one loop includes a closed loop adapted to be slid onto the at least one mounting element. In some embodiments, the at least one loop includes at least two straps adapted to be tied about the at least one mounting element to form the loop. In some embodiments, the at least one loop includes an elongate strip including a hook Velcro® portion and a corresponding loop Velcro® portion, the hook and loop Velcro® portions being adapted to engage each other such that the strip forms the loop. In some embodiments, the at least one loop includes an elongate strip including first and second magnetic elements, the first and second magnetic elements being adapted to engage each other such that the strip forms the loop.

In some embodiments, the first layer includes an insulating layer. In some embodiments, the second layer is formed of an insulating material.

In some embodiments, the second width is greater than the first width by at least 20%, at least 30%, at least 40%, or at least 50%. In some embodiments, a width ratio between the first width and the second width is in the range of 1:1.1-1:2. In some embodiments, the second width is greater than the first width by at least 10 cm, at least 20 cm, at least 30 cm, or at least 40 cm.

In some embodiments, the second length is greater than the first length by at least 20%, at least 30%, at least 40%, or at least 50%. In some embodiments, a width ratio between the first length and the second length is in the range of 1:1.1-1:2. In some embodiments, the second length is greater than the first length by at least 10 cm, at least 20 cm, at least 30 cm, or at least 40 cm.

In some embodiments, in the hanging mode the depth D is in the range of 12 cm-25 cm, or 15 cm-20 cm.

In some embodiments, in use in the hanging mode, the apexes of the at least two pockets come into contact with the user.

In some embodiments, the gap width is in the range of 25 cm-35 cm, or 28 cm-32 cm.

In some embodiments, in the hanging mode, a minimal width ($w_{min}$) of the air gap, defined between at least two of the pockets surrounding the air gap adjacent the first layer, is in the range of 0 cm-10 cm.

In some embodiments, the volume ($v_g$) of the air gap is sufficient to allow the user to breathe beneath the blanket without risk of suffocation.

In some embodiments, at least one of the first layer and the second layer includes a flame retardant layer. In some embodiments, at least one of the first layer and the second layer includes a hypoallergenic layer.

In some embodiments, the blanket further includes at least one additional layer disposed between the first layer and the second layer. In some embodiments, the at least one additional layer includes a flame retardant layer. In some embodiments, the at least one additional layer includes a hypoallergenic layer.

In some embodiments, at least one of the pockets is filled with a filling material other than air. In some embodiments, the filling material includes at least one of feathers, down, cotton, cashmere, wool, Merino wool, alpaca, fleece, fur, faux fur, polyester, and acrylic.

BRIEF DESCRIPTION OF THE FIGURES

The foregoing discussion will be understood more readily from the following detailed description of the invention, when taken in conjunction with the accompanying FIGS. 1-5), in which:

FIGS. 4A, 4B, 4C, and 4D, are, respectively, a perspective illustration, a top view planar illustration, and side view planar illustrations of the blanket of FIGS. 3A and 3B, mounted onto a crib and covering a user lying on the crib.

DESCRIPTION OF THE PREFERRED EMBODIMENTS

Figure 1:
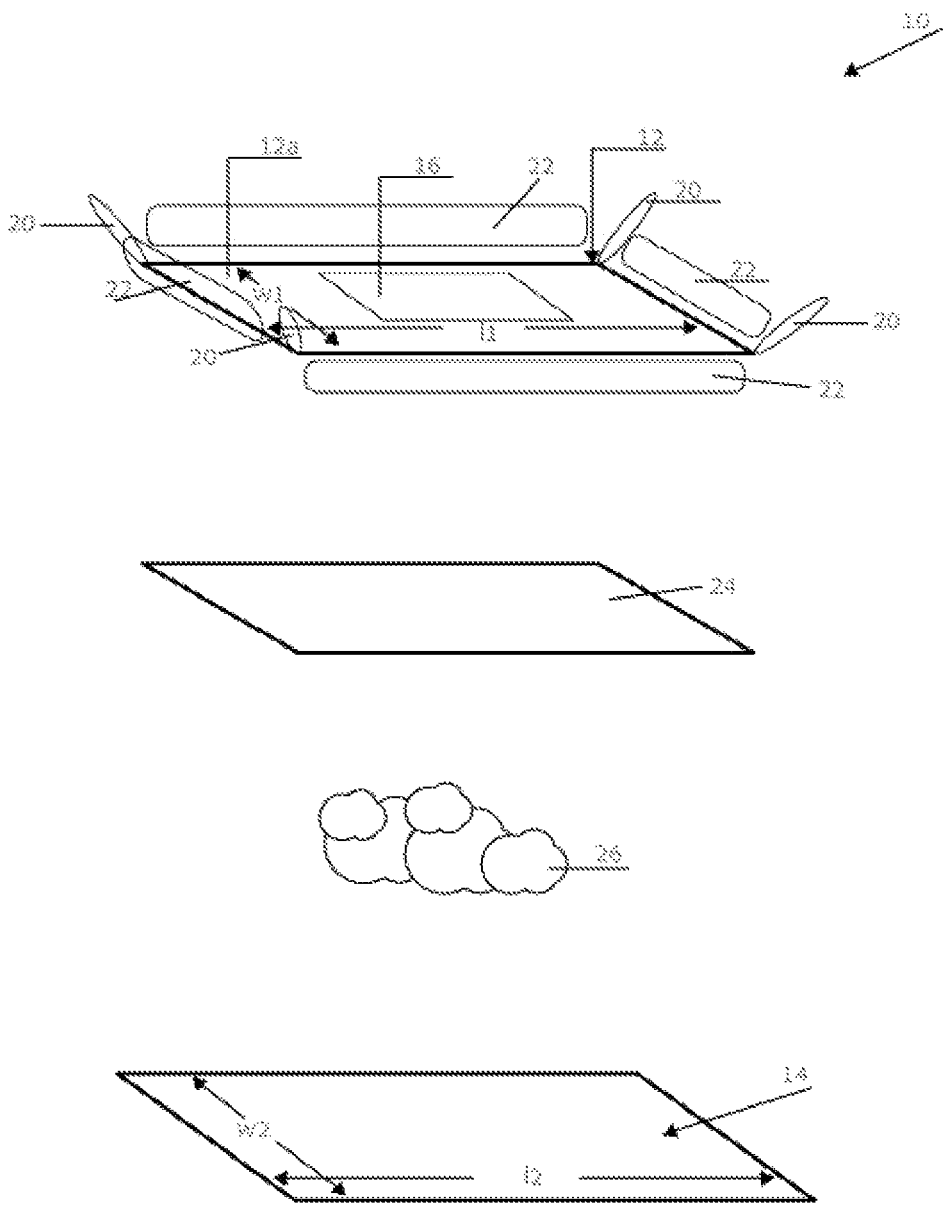
FIG. 1 is an exploded view illustration of a blanket according to an embodiment of the present invention.

The principles of the inventive blanket and system for covering a user, and of methods of use thereof, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In the context of the present application and claims, the term "User base platform" relates to any surface on which a user may sit or lie, and includes, among others, bed, crib, playpen, stroller, sofa.

In the context of the present application and claims, the term "stretch of fabric" relates to a piece of fabric which can be laid flat without any creases, pleats, or layers defined by portions of the stretch of fabric, and which forms a unitary structure such that when the stretch of fabric is held at one end thereof and is lifted in the air, it remains contiguous and does not separate into multiple pieces of fabric. A stretch of fabric as defined herein may include a single piece of fabric, or multiple pieces of fabric connected to each other, for example by sewing or by suitable fasteners.

In the context of the present application and claims, a first item and a second item are considered to be "attached" to one another if the first item is disposed above the second item or alongside the second item, and when one holds directly onto the first item and lifts it, the second item is lifted together with the first item, even if the first and second items are not directly engaging one another.

In the context of the present application and claims, a first layer and a second layer are considered to be "juxtaposed" when the layers are generally coplanar, even if they are not in engagement with one another or if there is a third item disposed between the two items. In some cases, the maximal distance between the first and second layers, when the layers are spread on a flat surface, is 3 cm, 4 cm, or 5 cm.

In the context of the present application and claims, a depth of a pocket formed between a first layer and second layer is defined as the maximal vertical distance between the first and second layers of any point within the pocket.

In the context of the present application and claims, an element is considered to be "internal" to a blanket if a shortest distance of the element from the perimeter of the blanket is at least 4 cm, and more typically, at least 5 cm, at least 6 cm, at least 8 cm, or at least 10 cm.

In the context of the present application and claims, the term "elongate stretch" of a blanket relates to any stretch having an elongated shape, regardless of the direction of elongation. As such, an elongated stretch may be disposed parallel to or along the length of the blanket or a longitudinal axis of the blanket, parallel to or along the width of the blanket or an axis transverse to the longitudinal axis, or at an angle or along a diagonal relative to an edge of the blanket.

Reference is now made to FIG. 1, which is an exploded view illustration of a blanket 10 according to an embodiment of the present invention.

As seen in FIG. 1, the blanket 10 includes a first layer 12 and a second layer 14.

The first layer 12 is formed of a first stretch of fabric, and has a first length ($l_1$) and a first width ($w_1$). In some embodiments, the first layer 12 is formed of an insulating material, is flexible, and may be at least partially elastic.

In some embodiments, a first face 12a of first layer 12 has disposed thereon one or more decorative elements 16, such as an applique or a print of the fabric from which first layer 12 is formed. In some embodiments, in which the blanket 10 is a baby blanket, the decorative element 16 may be a representation of interest to children, such as toys or clouds, as illustrated in FIG. 1. In some embodiments, the decorative element 16 may be a representation of a logo or trademark of a manufacturer or distributor of the blanket 10 or of an organization using the blanket 10 such as a hospital. Decorative element 16 may be connected to, or formed on, first face 12a using any suitable method, such as by stitches, glue, or any suitable type of fasteners.

The second layer 14 is formed of a second stretch of fabric, and has a second length ($l_2$) and a second width ($w_2$). In some embodiments, the second layer 14 is formed of, or includes, an insulating material. The second layer 14 is flexible, so as to be able to form pockets as described hereinbelow with respect to FIGS. 3A and 3B, and is generally not elastic.

The second layer 14 is larger than the first layer 12, so as to be able to form pockets as described hereinbelow with respect to FIGS. 3A and 3B. Specifically, the second width ($w_2$) is greater than the first width ($w_1$), and the second length ($l_2$) is greater than the first length ($l_1$).

In some embodiments, the second width ($w_2$) is greater than the first width ($w_1$) by at least 20%, at least 30%, at least 40%, or at least 50%. In some embodiments, a width ratio between the first width ($w_1$) and the second width ($w_2$) is in the range of 1:1.1-1:2. In some embodiments, the second width ($w_2$) is greater than the first width ($w_1$) by at least 10 cm, at least 20 cm, at least 30 cm, or at least 40 cm.

In some embodiments, the second length ($l_2$) is greater than the first length ($l_1$) by at least 20%, at least 30%, at least 40%, or at least 50%. In some embodiments, a width ratio between the first length ($l_1$) and the second length ($l_2$) is in the range of 1:1.1-1:2. In some embodiments, the second length ($l_2$) is greater than the first length ($l_1$) by at least 10 cm, at least 20 cm, at least 30 cm, or at least 40 cm.

In some embodiments, in which the blanket 10 is a baby blanket, the first length ($l_1$) is in the range of 70 cm-100 cm, the first width ($w_1$) is in the range of 50 cm-70 cm, the second length ($l_2$) is in the range of 100 cm-150 cm, and the second width ($w_2$) is in the range of 70 cm-100 cm.

In some embodiments, in which the blanket 10 is intended for use by an adult, or is a twin bed blanket, the first length ($l_1$) is in the range of 160 cm-200 cm, the first width ($w_1$) is in the range of 70 cm-90 cm, the second length ($l_2$) is in the range of 200 cm-250 cm, and the second width ($w_2$) is in the range of 110 cm-150 cm.

In some embodiments, the blanket 10 may further include an attachment mechanism 20 adapted for attachment of the blanket to a mounting element, as described hereinbelow with reference to FIGS. 3A to 5. In the embodiment illustrated in FIG. 1, the attachment mechanism 20 includes four straps adapted to be disposed at corners of the blanket 10.

In some embodiments, the blanket 10 may optionally further include one or more perimeter decorations 22, such as frills or tassels. In the embodiment illustrated in FIG. 1, the perimeter decoration 22 is a frill formed of four sections, adapted to be attached to each of the edges of the perimeter of the blanket. However, the perimeter decoration may be of any suitable type, may include any suitable number of pieces, and may be attached by any suitable mechanism, such as sewing, tying knots, connection by fasteners, gluing, and the like.

In some embodiments, the first layer 12 and/or the second layer 14 may comprise a flame retardant material, or be a flame retardant layer.

In some embodiments, the first layer 12 and/or the second layer 14 may comprise a hypoallergenic material, or be a hypoallergenic layer.

In some embodiments, the blanket may include one or more additional layers 24, which may be flame retardant and/or may be hypoallergenic. In some embodiments, the dimensions of the additional layer(s) 24 are substantially equal to those of the first layer 12.

In some embodiments, the blanket 10 further includes a filling material 26, other than air, adapted to be disposed between layers of the blanket, as described in further detail hereinbelow. In some such embodiments, the filling material comprises at least one of feathers, down, cotton, cashmere, wool, Merino wool, alpaca, fleece, fur, faux fur, polyester, and acrylic.

Figure 2A:
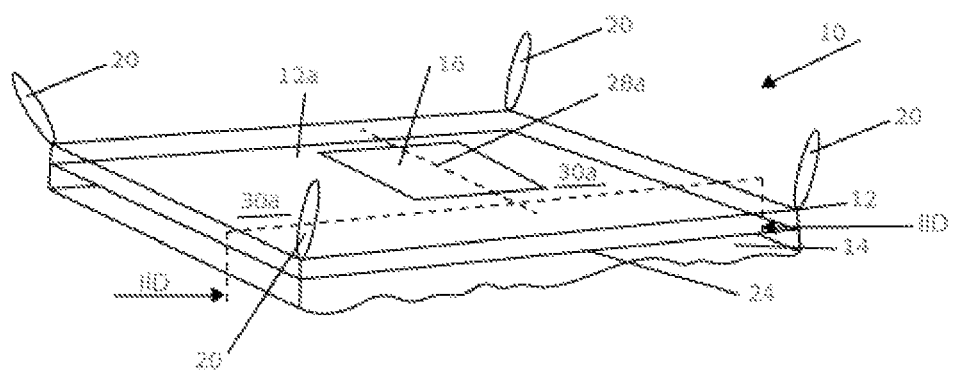
FIGS. 2A, 2B, and 2C are perspective view illustrations of a blanket according to an embodiment of the present invention, in a spread mode.
Figure 2B:
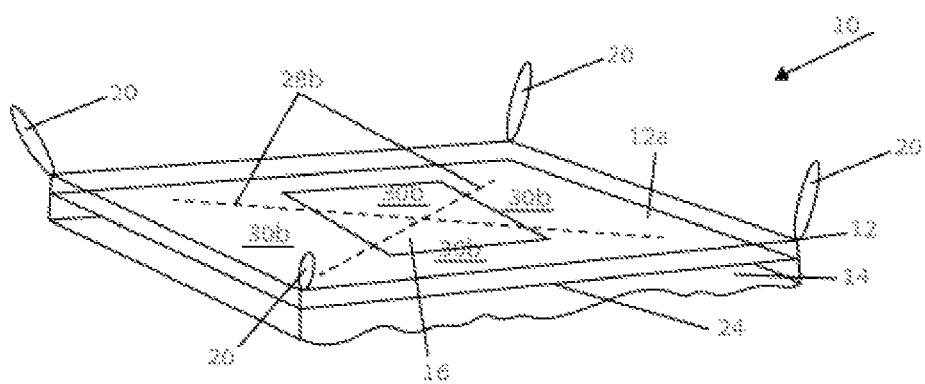
Figure 2C:
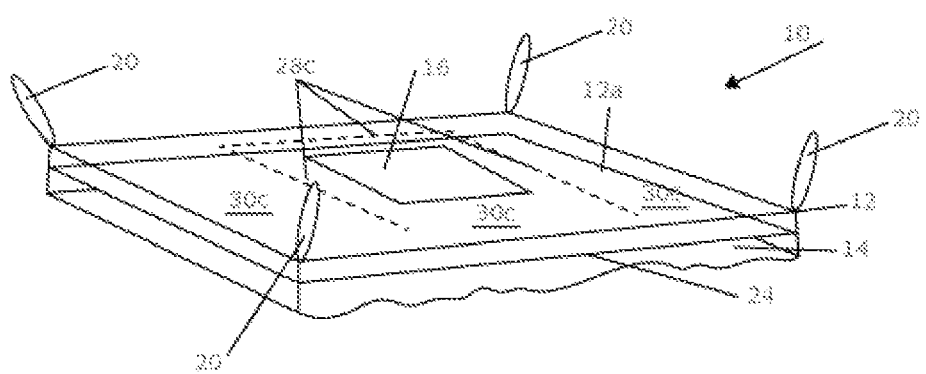
Figure 2D:
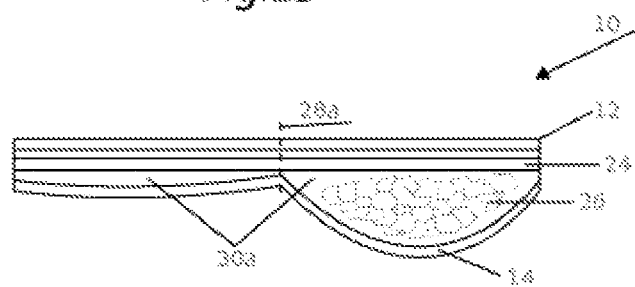
FIG. 2D is a sectional illustration of the blanket of FIG. 2A, the sectional illustration taken along section lines IID-IID in FIG. 2A.

Reference is now made to FIGS. 2A, 2B, and 2C, which are perspective view illustrations of blanket 10, in a spread mode, and to FIG. 2D, which is a sectional illustration of the blanket of FIG. 2A, the sectional illustration taken along section lines IID-IID in FIG. 2A.

As seen in FIGS. 2A-2D, when the blanket 10 is constructed, the second layer 14 is attached to the first layer 12, so as to be juxtaposed around a perimeter of blanket 10. In some embodiments, the first and second layers are sewn together around the perimeter of the blanket. In some embodiments, the first and second layers are adhered to one another around the perimeter of the blanket using a suitable glue or adhesive, such as an iron heated glue layer disposed between the first and second layers.

In embodiments in which first face 12a of first layer 12 includes a decorative element 16, the first layer 12 is attached to the second layer 14 such that face 12a is distal to second layer 14 and is visible from the exterior of the blanket 10.

The length and width dimensions of the blanket 10, when constructed, are substantially equal to those of first layer 12. As such, and because the second layer 14 is larger (in the length and width dimensions) than the first layer 12, excess length (the delta ($\Delta l$) between $l_2$ and $l_1$) and excess width (the delta ($\Delta w$) between $w_2$ and $w_1$) of the second layer 14 is arranged in the way of folds, creases, or pleats, which may arranged along the perimeter of the blanket 10.

In some embodiments, the perimeter decoration (illustrated in FIG. 1) and the attachment mechanism 20 are attached to the perimeter of the blanket, for example by sewing.

The first layer 12 and second layer 14 are also attached to one another along at least one internal elongate stretch of the blanket. For example, the first and second layer may be sewn or adhered to each other along the elongate stretch. As described hereinbelow with respect to FIGS. 3A and 3B, the attachment along the internal stretch defines at least two pockets between the first and second layers.

In some embodiments, in which the blanket 10 includes an additional layer 24, the additional layer is disposed between the first layer 12 and the second layer 14, and is attached thereto at the perimeter and along the internal elongate stretch(es), as illustrated in FIG. 2D.

In the embodiment illustrated in FIG. 2A, the layers 12 and 14 are sewn to each other along a single stretch 28a, which extends generally along the center of the blanket 10, and terminates internally of the perimeter of the blanket. The structure illustrated in FIG. 2A results in the formation of two pockets 30a in the blanket, arranged alongside one another along the length of the blanket 10, as described hereinbelow with reference to FIGS. 3A and 3B.

In the embodiment illustrated in FIG. 2B, the layers 12 and 14 are sewn to each other along two elongate stretches 28b, which extend generally diagonally across blanket 10 to form an "X" shape, and terminate internally of the perimeter of the blanket. The structure illustrated in FIG. 2B results in the formation of four pockets 30b in the blanket.

In the embodiment illustrated in FIG. 2C, the layers 12 and 14 are sewn to each other along three elongate stretches 28c, two of which extend along the length of the blanket and one of which extends along the width of the blanket at the end of the two elongate stretches, so as to form the shape of the Greek letter "Π". All the elongate stretches 28c, terminate internally of the perimeter of the blanket. The structure illustrated in FIG. 2C results in the formation of pockets 30c in the blanket.

In some embodiments, in which the blanket 10 includes a filling material 26 (other than air), the filling material is trapped within the pockets, as illustrated in FIG. 2D.

As shown in FIGS. 2A-2D, when blanket 10 is disposed on a flat surface, such as on a table or is laid out on the bed, the pockets 30a, 30b, and 30c are generally flat, and generally no gap is formed between the first layer 12 and the second layer 14, within the pockets, other than to facilitate the filling material 26, in embodiments that it is included.

Figure 3A:
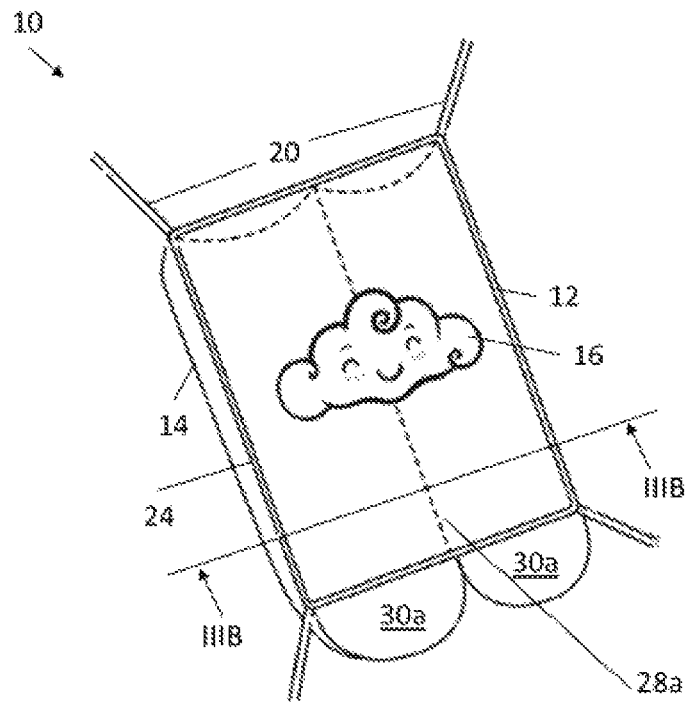
FIGS. 3A and 3B are, respectively, a perspective view illustration and a sectional illustration of the blanket of FIG. 2A, in a hanging mode, the sectional illustration taken along section lines IIIB-IIIB in FIG. 3A.
Figure 3B:
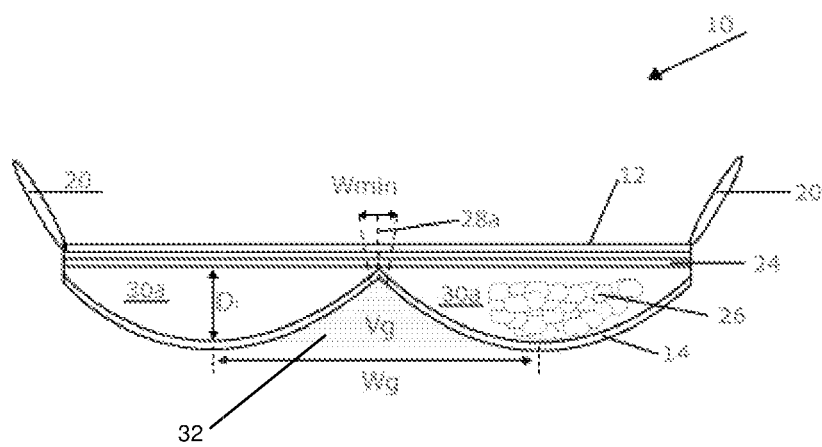

Reference is now additionally made to FIGS. 3A and 3B which are, respectively, a perspective view illustration and a sectional illustration of the blanket 10 of FIG. 2A, in a hanging mode, the sectional illustration taken along section lines IIIB-IIIB in FIG. 3A.

Figure 4A:
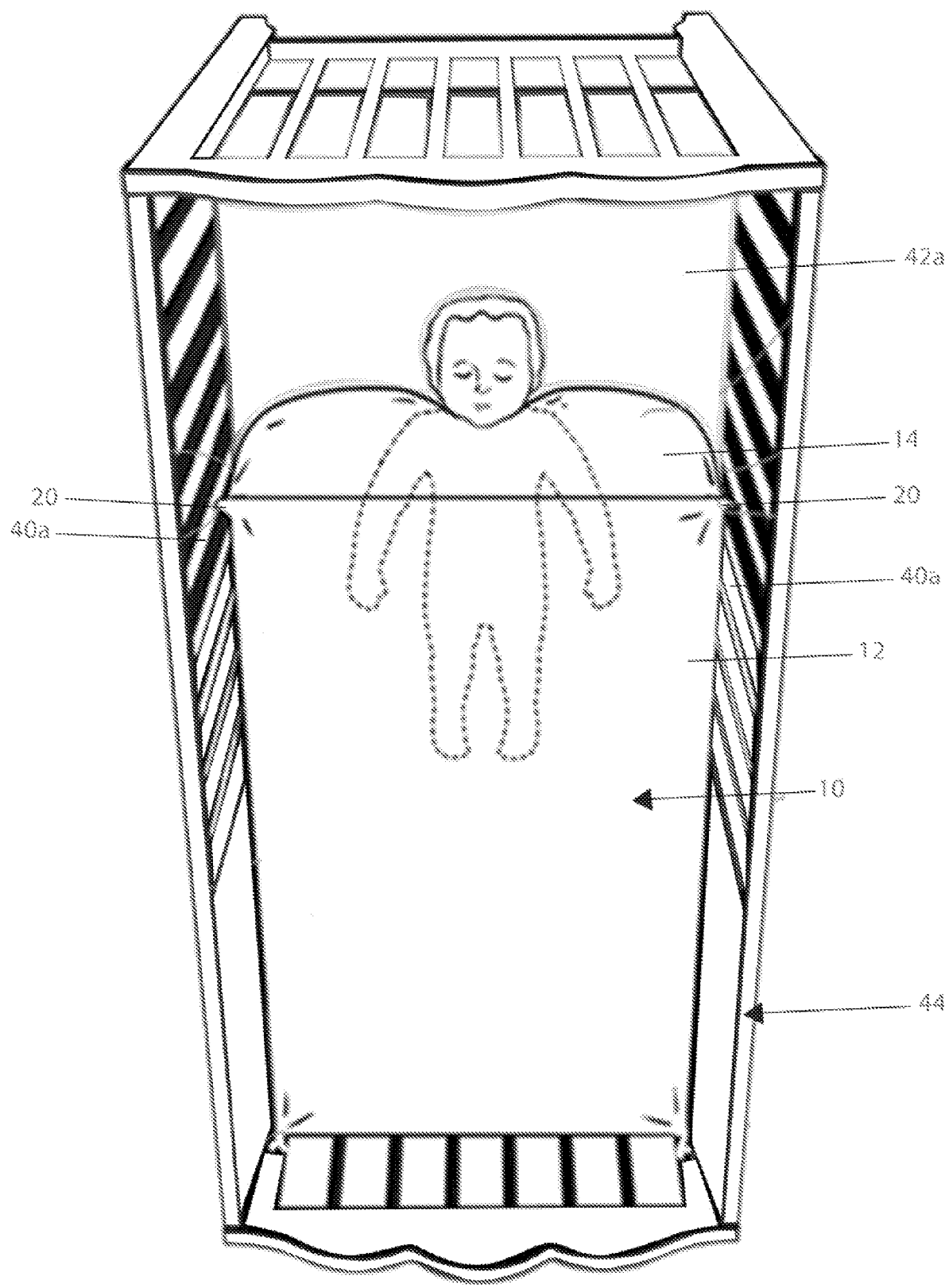
Figure 4B:
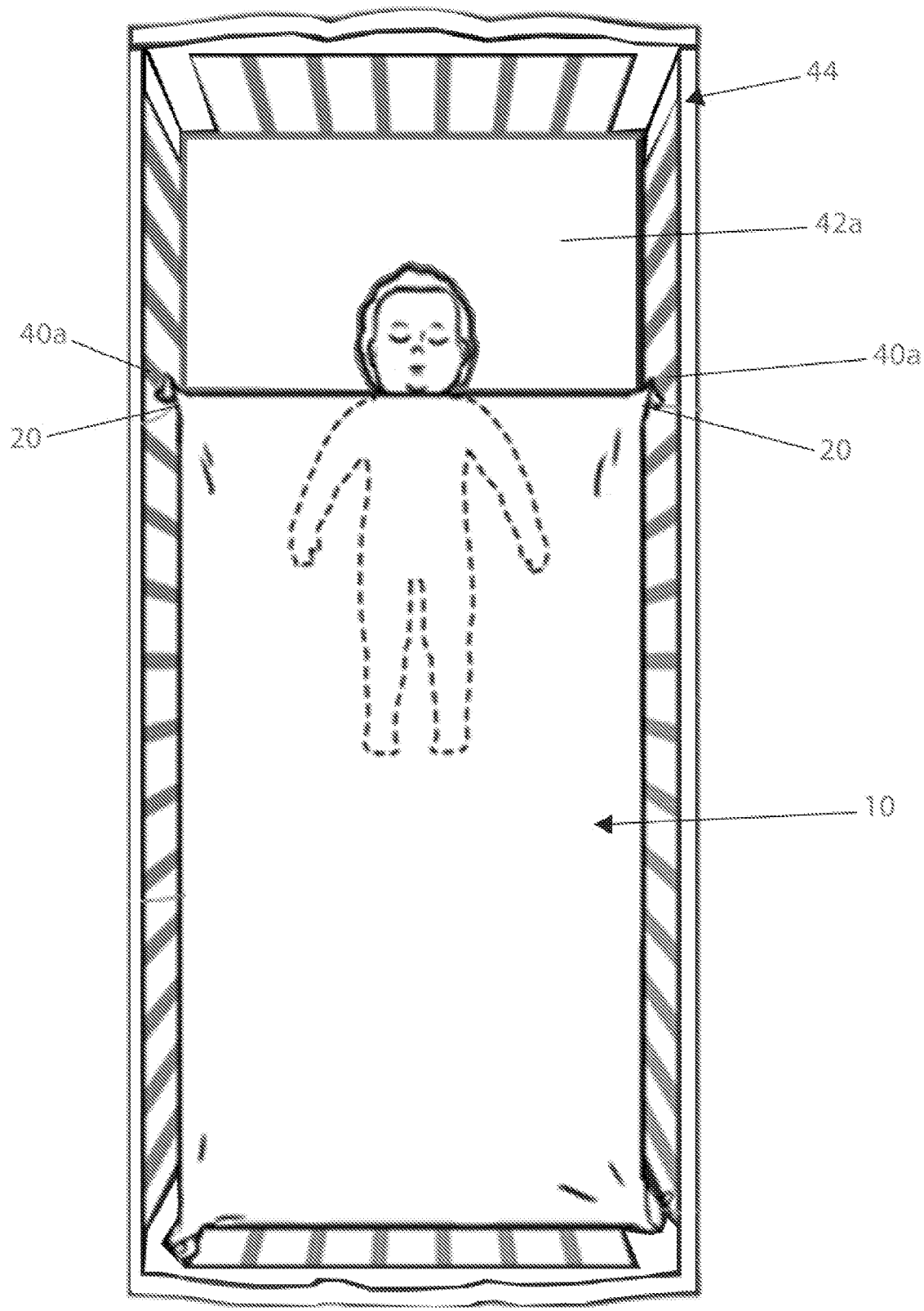
Figure 5:
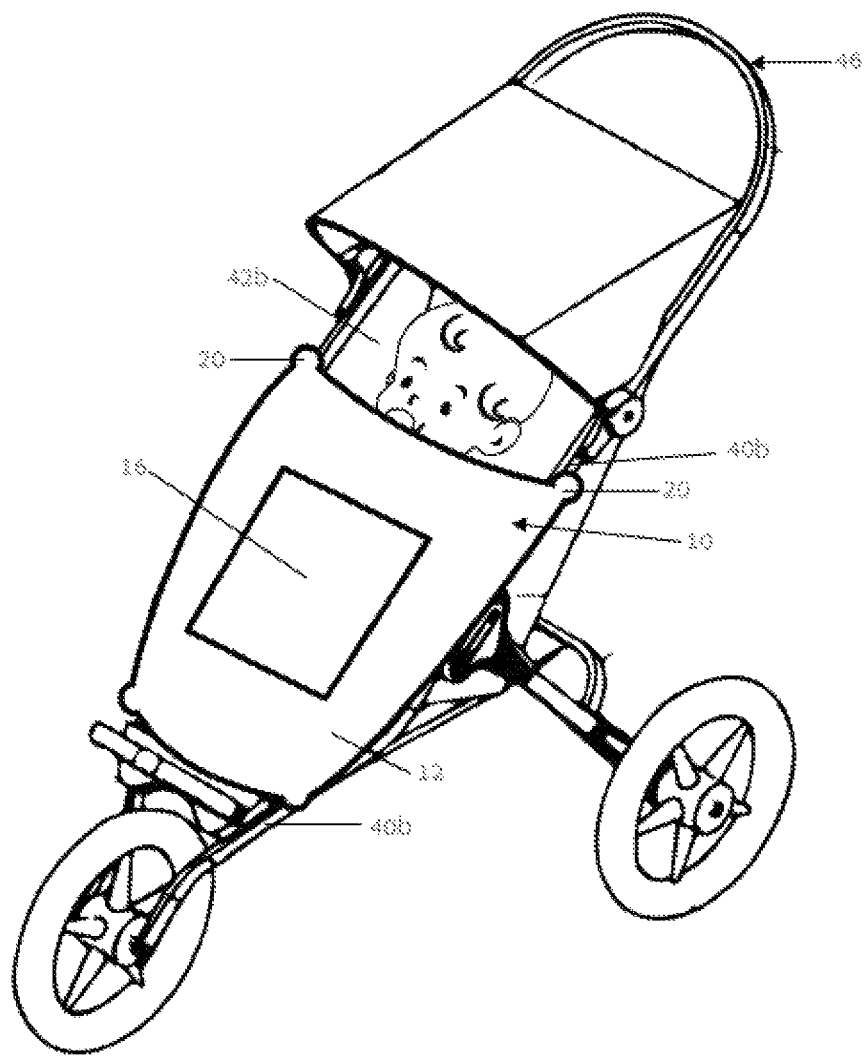
FIG. 5 is a perspective illustration of the blanket of FIGS. 3A and 3B, mounted onto a baby carriage and covering a user lying in the baby carriage.

As seen in FIG. 3A, in a hanging mode of blanket 10, for example when the blanket is hanging from a mounting element over a user base platform such as a crib (as illustrated in FIGS. 4A-4D), stroller (as illustrated in FIG. 5), or bed, the second layer 14 hangs beneath the first layer 12. Because the length and width of the second layer 14 are greater than the length and width of the first layer 12, the second layer 14 droops beneath the first layer 12 at pockets 30. Consequently, each of the pockets 30 has a depth, and at least one air gap 32 is formed between each two (or more) adjacent pockets 30.

The depth of the pockets 30 in the hanging mode depends on the width of the pocket and the extent to which second layer 14 is larger than first layer 12.

As shown clearly in FIG. 3B, in the hanging mode of the blanket 10, each of the pockets 30 has a depth (D), greater than zero, between the first layer 12 and the second layer 14. In some embodiments, the depth D is in the range of 10 cm-30 cm, 12 cm-25 cm, or 15 cm-20 cm.

The air gap 32 has a minimal width ($w_{min}$), defined between the pockets 30 surrounding the air gap adjacent the first layer 12, and a width ($w_g$) defined between apexes of the pockets 30 surrounding the air gap, at which apexes the depth of the pockets 30 is the depth D.

In some embodiments, the minimal width ($w_{min}$) of the air gap 32 is in the range of 0 cm-10 cm.

In some embodiments, the width ($w_g$) of the air gap 32 is in the range of 20 cm-40 cm, 25 cm-35 cm, or 28 cm-32 cm.

In some embodiments, the volume ($v_g$) of the air gap 32, which is defined between the minimal width ($w_{min}$) and the width ($w_g$) of the air gap 32 (the area being indicated in FIG. 3B between the pockets 30 and the width line $w_g$), along the entire length of the air gap 32, is sufficient to allow the user to breathe, when the user's head is in the air gap, without risk of suffocation.

In some embodiments, the volume of the air gap 32 may be dependent on the size of the blanket 10, and may differ between baby blankets, twin bed blankets, stroller blankets, and pet blankets, as defined above.

In some embodiments, the volume of air gap 32 may depend on the number of pockets 30 in the blanket, on the widths of the pockets 30, and/or on the depth of the pockets.

As explained in further detail hereinbelow with respect to FIGS. 4A-4D, in some embodiments, the volume of the air gap 32 is sufficient to allow a user using the blanket 10 to breath beneath the blanket 10 without risk of suffocation, for example while the user's head is disposed within the air gap 32. As such, the volume of the air gap may be designed to be suitable to the breathing patterns of the type of user expected to use the blanket. For example, a blanket intended to be used by an adult would need to have an air gap having a larger volume than a blanket intended for a baby, due to the fact that the lung capacity and oxygen volume needs of an adult are greater than those of a baby.

Turning now to FIGS. 4A-5, these figures illustrate methods of use of the blanket of FIGS. 1-3B. FIGS. 4A, 4B, 4C, and 4D, are, respectively, a perspective illustration, a top view planar illustration, and side view planar illustrations of the blanket 10 mounted onto a crib and covering a user lying on the crib. FIG. 5 is a perspective illustration of the blanket 10 mounted onto a baby carriage and covering a user lying in the baby carriage.

As seen in FIGS. 4A-5, in use, the blanket 10 is attached to one or more mounting elements 40 disposed above a user base platform 42, on which a user is positioned.

In the embodiment of FIGS. 4A-4D, the user base platform 42a comprises the mattress of a crib 44, and the mounting elements 40a are poles comprising a portion of a frame of the crib. In the embodiment of FIG. 5, the user base platform 42b comprises the seat of a stroller 46, and the mounting elements 40b are part of the frame of the stroller.

In some embodiments, the blanket 10 may be intended for use by an adult. In some such embodiments, the user base platform 42 may comprise a bed or a mattress of a bed, and the mounting element 40 may comprise at least one pole disposed at an edge of the bed. In some such embodiments, the bed may be a hospital bed, and the pole may be part of a frame of the hospital bed. In other such embodiments, the pole may be part of a barrier for preventing a user from falling off the bed, for example as common in bunk beds.

In some embodiments, the blanket may be intended for use by a pet. In some such embodiments, the user base platform may be an animal sleeping basket, and the mounting element may be a protrusion at an edge of the animal sleeping basket.

The blanket 10 may be attached to the mounting element(s) 40 by any suitable attachment mechanism(s). The attachment mechanism may be an attachment mechanism 20 forming part of the blanket 10 (FIG. 1), and/or may form part of the mounting element(s) 40.

The following description relates to a single attachment mechanism attaching the blanket 10 to a single mounting element 40, but it is appreciated that any suitable number of attachment mechanisms and mounting elements may be used, as needed for the specific blanket and/or user base platform.

In some embodiments, the attachment mechanism comprises an attachment mechanism 20 forming part of the blanket 10, and includes one or more loops disposed about the mounting element 40, as illustrated in FIGS. 4A-5. In the illustrated embodiments, the loop is formed of one or two straps of fabric, which are tied around the mounting element and form the loop. In other embodiments, the loop may be a closed loop, which is adapted to be slid onto the mount mounting element 40 to attach the blanket thereto. It is appreciated that such a closed loop would only be suitable when the mounting element is narrow enough for sliding the loop thereonto, and does not have any blocking bars along the length of the mounting element.

In some embodiments, the attachment mechanism includes a first portion of a snap fit engagement attached to the blanket 10, and a second portion of the snap fit engagement attached to, or forming part of, the mounting element. As such, the attachment mechanism attaches the blanket 10 to the mounting element by snap fit attachment of the first portion and second portion to each other.

In some embodiments, the attachment mechanism includes at least one clasping unit attached to, or forming part of, the mounting element 40. The clasping unit is adapted to clasp at least one portion of the blanket 10, so as to attach the blanket to the mounting element. For example, the clasping unit may comprise something as simple as a clothes pin attached to the mounting element and adapted to clasp the blanket 10.

In some embodiments, the attachment mechanism comprises at least one Velcro® portion, including a hook side and a loop side. In some such embodiments, one of the hook and loop sides is attached to the mounting element, and the other is attached to the blanket 10, such that attachment of blanket to the mounting element is accomplished by engagement of the corresponding sides of the Velcro® on the mounting element 40 and blanket 10. In other such embodiments, the attachment mechanism comprises an elongate strip attached to the blanket 10, the elongate strip including a hook Velcro® portion and a corresponding loop Velcro® portion. The blanket may be attached to the mounting element by looping the elongate strip about the mounting element and then engaging the corresponding hook and loop Velcro® portions, such that the elongate strip forms a loop about the mounting element.

In some embodiments, the attachment mechanism includes at least one magnetic element. In some such embodiments, the attachment mechanism includes a first magnetic element attached to the blanket 10, and a second magnetic element attached to, or forming part of, the mounting element. As such, the attachment mechanism attaches the blanket 10 to the mounting element by magnetic attachment of the first and second magnetic elements to each other. In other such embodiments, the attachment mechanism comprises an elongate strip attached to the blanket 10, the elongate strip including two corresponding magnetic elements adapted to magnetically attach to one another. The blanket may be attached to the mounting element by looping the elongate strip about the mounting element and then attaching the corresponding magnetic elements to one another, such that the elongate strip forms a loop about the mounting element.

In some embodiments, the one or more attachment mechanisms attach the blanket to the one or more mounting elements at at least two edges of the blanket, such that a tension of the blanket in at least one dimension thereof does not change even if the user moves beneath the blanket. In some such embodiments, the one or more attachment mechanisms attach the blanket to one or more mounting elements at four edges or four corners of the blanket, as illustrated in FIGS. 4A-4D, such that a tension of the blanket in the length dimension and in the width dimension does not change even if the user moves beneath the blanket.

As seen in FIGS. 4A-4D, in use, the blanket may be attached to the mounting elements such that the lowest portion of the second layer 14, where the pockets 30 have the depth D, comes into contact with the user.

As seen in FIGS. 4A-4D, the attachment mechanisms 20 on the blanket, or any other attachment mechanism, may be used to ensure that the first layer 12 of the blanket is kept taut between the mounting elements. As such, the user will not become tangled in the blanket, preventing the risk of suffocation, and a caretaker of the user would not need to keep re-spreading the blanket.

Additionally, due to the air gap 32, even if the user inserted his head under the blanket, for example a baby crawling around the crib would crawl under the blanket, the user would still have sufficient air to prevent suffocation, as explained hereinabove.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Similarly, the content of a claim depending from one or more particular claims may generally depend from the other, unspecified claims, or be combined with the content thereof, absent any specific, manifest incompatibility therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for covering a user, the system comprising:
a user base platform adapted to have the user positioned thereon;
at least one mounting element, disposed about said user base platform;
a blanket, including:
  a first layer formed of a first stretch of fabric, said first stretch of fabric having, when fully spread out, a first length ($l_1$) and a first width ($w_1$);
  a second layer formed of a second stretch of fabric, said second stretch of fabric having, when fully spread out, a second length ($l_2$) and a second width ($w_2$), said second length being greater than said first length and said second width being greater than said first width,
  wherein said first and second layers are attached to one another so as to be juxtaposed to one another around a perimeter of said blanket, and along at least one internal elongate stretch of said blanket so as to define at least two pockets formed between said first and second layers,
  wherein, in a resting disposition defined by said blanket being spread out on a flat surface, excess length and width of said second layer is arranged in at least one arrangement selected from the group consisting of folds, creases, and pleats; and
an attachment mechanism adapted to attach said blanket to said at least one mounting element,
said system adapted to have an operative, hanging mode, in which said blanket is attached to said at least one mounting element and hangs over said user base platform;
wherein, in said operative hanging mode, a portion of said second layer forming one of said at least two pockets has a greater width and a greater length than a corresponding portion of said first layer forming said one of said at least two pockets, wherein, in said operative, hanging mode, said at least two pockets each have a respective depth (D) between said first layer and said second layer, said depth (D) being within the range of 10 cm to 30 cm, wherein, in said operative, hanging mode, an air gap is formed between said at least two pockets, and wherein, in said operative hanging mode, said second layer of each of said at least two pockets defines an apex at said depth D, and wherein a width of said air gap ($w_g$), defined between apexes of said at least two pockets surrounding said air gap, is within the range of 20 cm to 40 cm.

2. The system of claim 1, wherein in operative hanging mode, said second layer of each of said at least two pockets defines an apex at said depth D, and wherein when the user is positioned on said user base and said system is in said operative hanging mode, said apexes of said at least two pockets come into contact with the user.

3. The system of claim 1, wherein at least one of said first and second layers comprises an insulating layer.

4. The system of claim 1, wherein said second width is greater than said first width by at least 20%.

5. The system of claim 1, wherein a width ratio between said first width and said second width is in the range of 1:1.1 to 1:2.

6. The system of claim 1, wherein said second width is greater than said first width by at least 10 cm.

7. The system of claim 1, wherein said second length is greater than said first length by at least 20%.

8. The system of claim 1, wherein a length ratio between said first length and said second length is in the range of 1:1.1 to 1:2.

9. The system of claim 1, wherein said second length is greater than said first length by at least 10 cm.

10. The system of claim 1, wherein in said operative hanging mode, a minimal width ($W_{min}$) of said air gap, defined between said at least two pockets surrounding said air gap adjacent said first layer, is in the range of 0 cm to 10 cm.

11. The system of claim 1, wherein in said operative hanging mode, a volume ($v_g$) of said air gap is sufficient to allow the user to breathe, when the user's head is disposed beneath said blanket, without risk of suffocation.

12. The system of claim 1, further comprising at least one additional layer disposed between said first layer and said second layer.

13. The system of claim 1, wherein said user base platform comprises a mattress of a bed, and said at least one mounting element comprises at least one pole disposed at an edge of said bed.

14. The system of claim 1, wherein said user base platform comprises a mattress of a crib, and said at least one mounting element comprises a portion of a frame of said crib.

15. The system of claim 1, wherein said user base platform comprises a seat of a stroller, and said at least one mounting element comprises at least part of a frame of said stroller.

16. The system of claim 1, wherein said attachment mechanism comprises at least one clasping unit attached to said at least one mounting element and adapted to clasp at least one portion of said blanket.

17. A system for covering a user, the system comprising:
  a user base platform adapted to have the user positioned thereon;
  at least one mounting element, disposed about said user base platform;
  a blanket, including:
    a first layer formed of a first stretch of fabric, said first stretch of fabric having, when fully spread out, a first length ($l_1$) and a first width ($w_1$);
    a second layer formed of a second stretch of fabric, said second stretch of fabric having, when fully spread out, a second length ($l_2$) and a second width ($w_2$), said second length being greater than said first length and said second width being greater than said first width,
    wherein said first and second layers are attached to one another so as to be juxtaposed to one another around a perimeter of said blanket, and along at least one internal elongate stretch of said blanket so as to define at least two pockets formed between said first and second layers,
    wherein at least one of a width ratio between said first width and said second width and a length ratio between said first length and said second length is in the range of 1:1.1 to 1:2; and
  an attachment mechanism adapted to attach said blanket to said at least one mounting element,
  said system adapted to have an operative, hanging mode, in which said blanket is attached to said at least one mounting element and hangs over said user base platform;
  wherein, in said operative, hanging mode, said at least two pockets each have a respective depth (D) between said first layer and said second layer, said depth (D) being within the range of 10 cm to 30 cm,
  wherein, in said operative, hanging mode, an air gap is formed between said at least two pockets, and
  wherein, in said operative hanging mode, said second layer of each of said at least two pockets defines an apex at said depth D, and wherein a width of said air gap ($w_g$), defined between apexes of said at least two pockets surrounding said air gap, is within the range of 20 cm to 40 cm.

18. The system of claim 17, wherein in operative hanging mode, said second layer of each of said at least two pockets defines an apex at said depth D, and wherein when the user is positioned on said user base and said system is in said operative hanging mode, said apexes of said at least two pockets come into contact with the user.

19. The system of claim 17, wherein in said hanging mode, a minimal width ($W_{min}$) of said air gap, defined between said at least two pockets surrounding said air gap adjacent said first layer, is in the range of 0 cm to 10 cm.

20. The system of claim 17, wherein in said hanging mode a volume ($v_g$) of said air gap is sufficient to allow the user to breathe, when the user's head is beneath said blanket, without risk of suffocation.

* * * * *